United States Patent
Jagan et al.

(10) Patent No.: US 10,445,615 B2
(45) Date of Patent: Oct. 15, 2019

(54) METHOD AND DEVICE FOR EXTRACTING IMAGES FROM PORTABLE DOCUMENT FORMAT (PDF) DOCUMENTS

(71) Applicant: WIPRO LIMITED, Bangalore (IN)

(72) Inventors: Balaji Jagan, Dindigul (IN); Naveen Kumar Nanjappa, Bengaluru (IN)

(73) Assignee: Wipro Limited, Bangalore (IN)

(*) Notice: Subject to any disclaimer, the term of this patent is extended or adjusted under 35 U.S.C. 154(b) by 73 days.

(21) Appl. No.: 15/646,512

(22) Filed: Jul. 11, 2017

(65) Prior Publication Data
US 2018/0341830 A1   Nov. 29, 2018

(30) Foreign Application Priority Data
May 24, 2017   (IN) .............................. 201741018278

(51) Int. Cl.
*G06K 9/46*    (2006.01)
*G06K 9/00*    (2006.01)
*G06K 9/20*    (2006.01)

(52) U.S. Cl.
CPC ......... *G06K 9/469* (2013.01); *G06K 9/00456* (2013.01); *G06K 9/00469* (2013.01);
(Continued)

(58) Field of Classification Search
CPC .. G06K 9/469; G06K 9/00469; G06K 9/4604; G06K 9/00456; G06K 9/2009; G06K 2209/27
See application file for complete search history.

(56) References Cited

U.S. PATENT DOCUMENTS

| | | |
|---|---|---|
| 7,162,084 B2 | 1/2007 | Herley |
| 8,645,819 B2 | 2/2014 | Dejean |

(Continued)

FOREIGN PATENT DOCUMENTS

| | | |
|---|---|---|
| EP | 1 555 804 | 7/2005 |
| EP | 1 840 797 | 10/2007 |

(Continued)

OTHER PUBLICATIONS

Extended European Search Report issued in the European Patent Office in counterpart European Application No. 17186070.3, dated Mar. 5, 2018, 8 pages.

*Primary Examiner* — Ming Y Hon
(74) *Attorney, Agent, or Firm* — Finnegan, Henderson, Farabow, Garrett & Dunner, LLP (57) ABSTRACT

A method and device for extracting images from PDF documents are disclosed. The method includes performing a text recognition process on a PDF document that includes one or more images. The text recognition process replaces the one or more images with a plurality of contiguous newlines. The method further includes storing a location of each of the one or more images within the PDF document based on occurrence of the plurality of contiguous newlines within the PDF document. The method includes converting each page of the PDF document to an image format in order to generate an image document corresponding to the PDF document. The method further includes extracting each of the one or more images from the image document based on the location stored for each of the one or more images within the PDF document.

15 Claims, 5 Drawing Sheets

(52) U.S. Cl.
 CPC ......... *G06K 9/2009* (2013.01); *G06K 9/4604* (2013.01); *G06K 2209/27* (2013.01)

(56) References Cited

U.S. PATENT DOCUMENTS

| | | | |
|---|---|---|---|
| 9,122,980 B2 | 9/2015 | Yamane et al. | |
| 9,535,880 B2* | 1/2017 | Gupta | G06F 17/211 |
| 2002/0041717 A1* | 4/2002 | Murata | G06T 5/006 |
| | | | 382/275 |
| 2010/0037497 A1* | 2/2010 | Anelevitz | G09F 13/22 |
| | | | 40/544 |
| 2010/0082937 A1* | 4/2010 | Sasaki | G06F 17/2235 |
| | | | 711/206 |
| 2011/0035660 A1* | 2/2011 | Lussier | G06F 17/212 |
| | | | 715/239 |
| 2011/0052062 A1* | 3/2011 | Chiu | G06K 9/00456 |
| | | | 382/176 |
| 2011/0072019 A1* | 3/2011 | Fukasawa | G06T 11/60 |
| | | | 707/737 |
| 2014/0247965 A1* | 9/2014 | Van Wesep | G09B 7/06 |
| | | | 382/103 |
| 2015/0262007 A1 | 9/2015 | Sesum et al. | |
| 2017/0126926 A1* | 5/2017 | Saito | H04N 1/00307 |
| 2017/0160185 A1* | 6/2017 | Minemura | G01B 9/02081 |

FOREIGN PATENT DOCUMENTS

| | | |
|---|---|---|
| KR | 10-1394280 | 5/2014 |
| WO | WO 03/032202 | 4/2003 |
| WO | WO 2013/026245 | 2/2013 |

* cited by examiner

METHOD AND DEVICE FOR EXTRACTING IMAGES FROM PORTABLE DOCUMENT FORMAT (PDF) DOCUMENTS

TECHNICAL FIELD

This disclosure relates generally to extracting images from documents and more particularly to method and device for extracting images from Portable Document Format (PDF) documents.

BACKGROUND

PDF documents are widely used nowadays as brochures, manuals, white papers, financial documents, or presentations and have mostly replaced previous formats for the above mentioned purposes. Examples of the previous formats include, but are not limited to text files, Hyper Text Markup Language (HTML) pages, MS Word documents, MS Excel, and Comma Separated Values (CSV) files. However, extracting information from PDF documents is difficult when compared to other formats mentioned above. One of the reasons is that PDF documents are of different types and may be generated in multiple different formats.

Conventional techniques may extract text, images, and tables from PDF documents. However, the conventional techniques fail to extract vector graphic images from the PDF, while retaining vital information. Vector graphic images are mostly included in technical manuals, troubleshooting manuals, or enterprise articles that are in the PDF format. A vector graphic image is not extracted as a singled image and is scattered into small segments after extraction. As a result, conventional image extraction techniques are not accurate.

SUMMARY

In one embodiment, a method for extracting images from Portable Document Format (PDF) documents is disclosed. The method includes performing, by an image extraction device, a text recognition process on a PDF document that includes one or more images, wherein the text recognition process replaces the one or more images with a plurality of contiguous newlines. The method further includes storing, by the image extraction device, a location of each of the one or more images within the PDF document based on occurrence of the plurality of contiguous newlines within the PDF document. The method includes converting, by the image extraction device, each page of the PDF document to an image format in order to generate an image document corresponding to the PDF document. The method further includes extracting, by the image extraction device, each of the one or more images from the image document based on the location stored for each of the one or more images within the PDF document.

In another embodiment, an image extraction device for extracting images from PDF documents is disclosed. The image extraction device includes a processor; and a memory communicatively coupled to the processor, wherein the memory stores processor instructions, which, on execution, causes the processor to perform a text recognition process on a PDF document that includes one or more images, wherein the text recognition process replaces the one or more images with a plurality of contiguous newlines. The processor is further caused to store a location of each of the one or more images within the PDF document based on occurrence of the plurality of contiguous newlines within the PDF document. The processor is caused to convert each page of the PDF document to an image format in order to generate an image document corresponding to the PDF document. The processor is further caused to extract each of the one or more images from the image document based on the location stored for each of the one or more images within the PDF document.

In yet another embodiment, a non-transitory computer-readable storage medium is disclosed. The non-transitory computer-readable storage medium has instructions stored thereon, a set of computer-executable instructions causing a computer that includes one or more processors to perform steps including performing a text recognition process on a PDF document that includes one or more images, wherein the text recognition process replaces the one or more images with a plurality of contiguous newlines. The steps include storing a location of each of the one or more images within the PDF document based on occurrence of the plurality of contiguous newlines within the PDF document. The steps further include converting each page of the PDF document to an image format in order to generate an image document corresponding to the PDF document. The steps include extracting each of the one or more images from the image document based on the location stored for each of the one or more images within the PDF document.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
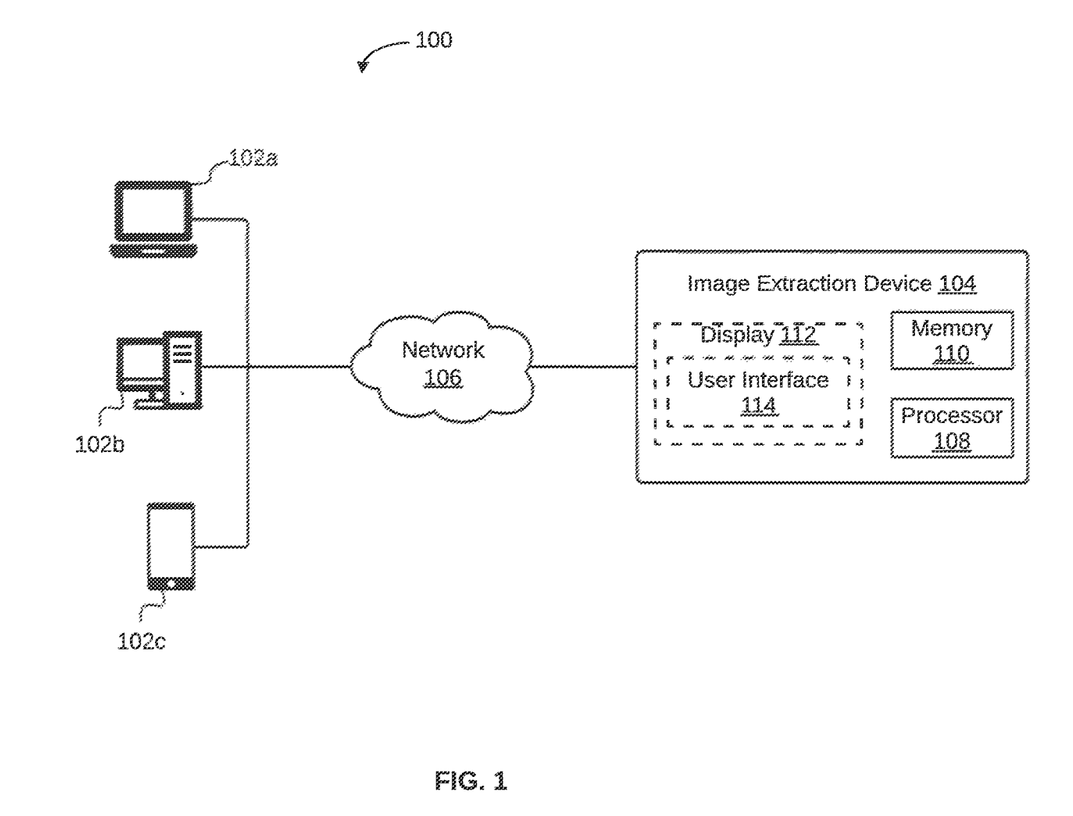
FIG. 1 is a block diagram illustrating a system for extracting images from Portable Document Format (PDF) documents, in accordance with an embodiment.

Additional illustrative embodiments are listed below. In one embodiment, a system 100 for extracting images from Portable Document Format (PDF) documents is illustrated in FIG. 1. In addition to text, PDF documents may include one or more images. The one or more images may be vector graphic images, which may not be accurately extracted using conventional techniques. Vector graphics use polygons to represent images in computer graphics. As vector graphic images are based on vectors that lead through locations called control points (or nodes), each of the control points has a definite position or coordinates on the X and Y axis of a page within the document or the work plane. This determines the direction of the path for a vector and each such path may be may be assigned various attributes. Examples of the attributes may include, but are not limited to stroke color, shape, curve, thickness, and fill. However, as the vector graphic images are drawn in the PDF document itself, the vector graphic images may be extracted as segments of an image instead of a single image. Joining the separate segments of images to obtain the original image is a tedious task and may also result in loss of information.

The PDF documents may be accessed by one or more of a laptop 102a, a desktop 102b, and a smart phone 102c, collectively referred to as a plurality of computing device 102. Other examples of plurality of computing devices 102 may include, but are not limited to a phablet or a tablet. System 100 further includes an image extraction device 104 that communicates with one or more of plurality of computing devices 102 via a network 106 and extract images from PDF documents accessed by one or more of plurality of computing device 102. Network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Image extraction device 104 may be a server or a computing device similar to one of plurality of computing devices 102. Once a user of one of plurality of computing devices 102 submits a request for extracting an image from a PDF document, image extraction device 104 identifies location of the image within the PDF document and subsequently extracts the same from the PDF document. To this end, image extraction device 104 includes a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 110 further includes various modules that enable image extraction device 104 to identify and extract images from PDF documents. The modules are explained in detail in conjunction with FIG. 2. Image extraction device 104 may further include a display 112 having a User Interface (UI) 114 that may be used by an administrator to provide inputs and to interact with image extraction device 104. Display 112 may further be used to display result of the image extraction performed by image extraction device 104. In an embodiment, the functionality of image extraction device 104 to extract images from a PDF document may be built into each of plurality of computing devices 102 via an application.

Figure 2:
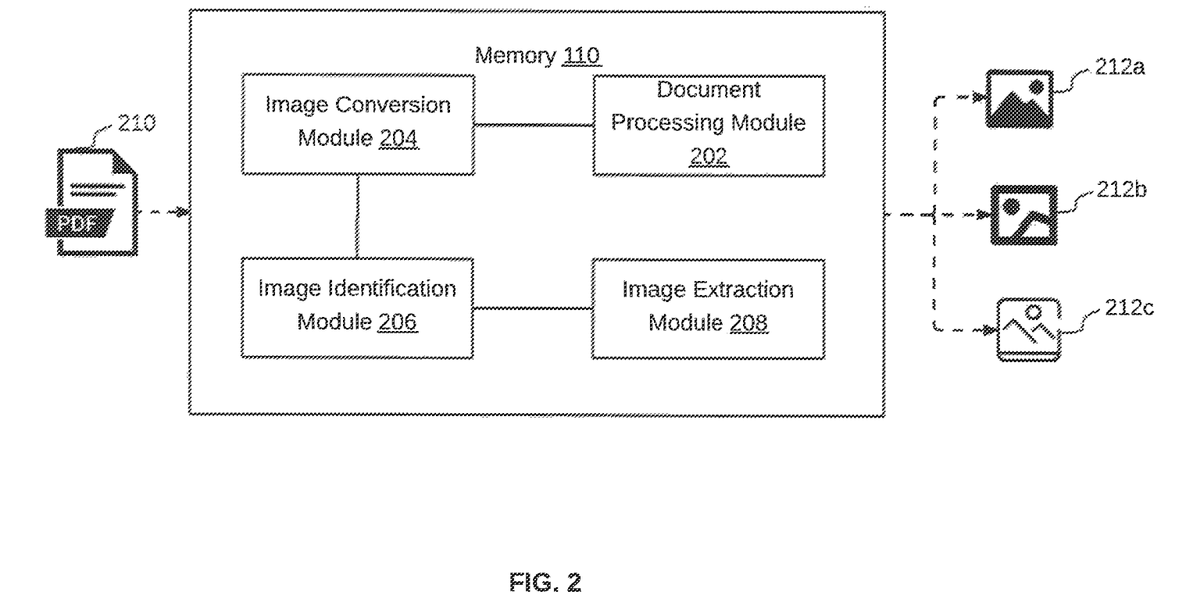
FIG. 2 is a block diagram illustrating various modules within a memory of an image extraction device configured to extract images from PDF documents, in accordance with an embodiment.

Referring now to FIG. 2, a block diagram of various modules within memory 110 of image extraction device 104 configured to extract images from PDF documents is illustrated, in accordance with an embodiment. Memory 110 in image extraction device 104 includes a document processing module 202, an image conversion module 204, an image identification module 206, and an image extraction module 208.

A PDF document 210 that includes one or more images is received by image extraction device 104 for extraction of the one or more images from PDF document 210. At least one of the one or more images may be a vector graphic image. To this end, document processing module 202 performs a text recognition process on PDF document 210. The text recognition process may be performed using an Open source Computer Vision (OpenCV) tool that extracts contents from PDF document 210 without losing any format related information. The text recognition process replaces each image within PDF document 210 with a plurality of contiguous newlines. Once each of the one or more images have been replaced with contiguous newlines, document processing module 202 stores a location of each of the one or more images within the PDF document based on occurrence of the plurality of contiguous newlines. The location of an image within the PDF document may include coordinates of the image and a page number of the page that includes the image. This is further explained in detail in conjunction with FIG. 3.

Image conversion module 204 then converts each page of PDF document 210 to an image format in order to generate an image document corresponding to PDF document 210. The conversion of PDF document 210 into an image document is an intermediate step. The image format may be one of Joint Photographic Experts Group (JPEG), Graphics Interchange Format (GIF), Bitmap (BMP), or Portable Networks Graphics (PNG). Thereafter, based on the location stored for each of the one or more images within PDF document 210, image identification module 206 applies image identification techniques to enable extraction of each of the one or more images from the image document. Image identification module 206 may read each of the one or more images as matrix, such that, the matrix includes binary values. Image identification module 206 incrementally scans a page of the image document that includes an image, in order to extract the image from the image document. This is repeated for each of the one or more images within PDF document 210. Incremental scanning may include, tracing the contour of the image based on the coordinates of corners of the image in either a square or a rectangle pattern. In order to differentiate between two images within the same page, spaces between the two images, which may be indicated by textual lines or empty spaces in the page, may be utilized. Additionally, the X and Y axis of contours may change based on the spacing between the two images. This is further explained in detail in conjunction with FIG. 3 and FIG. 4.

In response to identification of the one or more images within PDF document 210, image extraction module 208 extracts the one or more images from PDF document 210. The one or more images extracted, for example, may be an image 212a, an image 212b, and an image 212c. The one or more images after extraction are stored in a predefined format, which may include, but is not limited to JPEG, BMP, GIF, or PNG. The one or more images after extraction may also be tagged with respective location metadata. This is further explained in detail in conjunction with FIG. 3 and FIG. 4.

Figure 3:
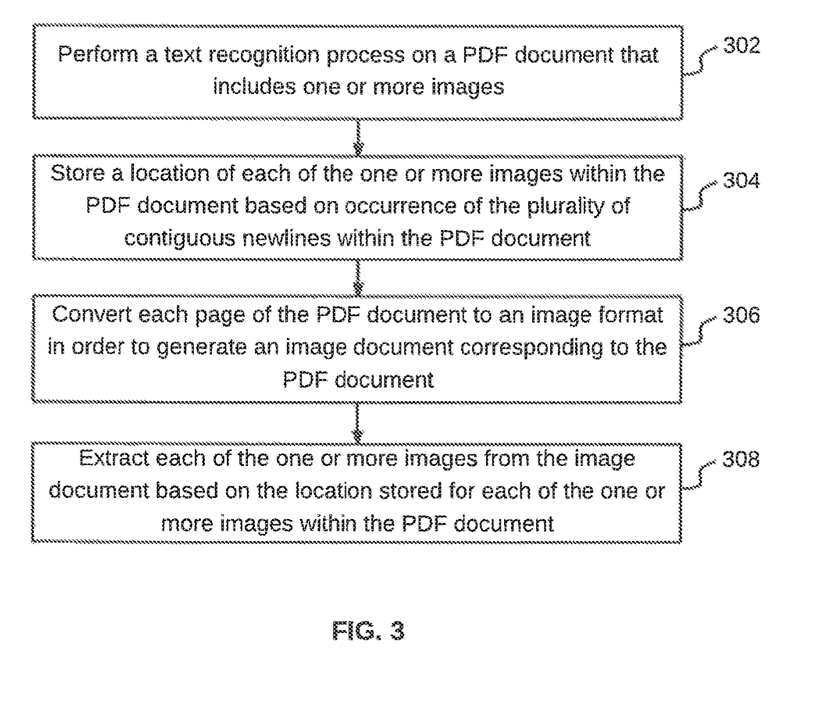
FIG. 3 illustrates a flowchart of a method of extracting images from PDF documents, in accordance with an embodiment.

Referring to FIG. 3, a flowchart of a method for extracting images from PDF documents is illustrated, in accordance with an embodiment. At step 302, image extraction device 104 performs a text recognition process on a PDF document that includes one or more images. At least one of the one or more images may be a vector graphic image. The text recognition process may be performed using an OpenCV tool that extract contents from a PDF document without losing any format related information. It will be apparent to a person skilled in the art that the invention is not limited to OpenCV tool and other similar text recognition tools may also be used. The text recognition process replaces the one or more images within the PDF document with a plurality of contiguous newlines. The plurality of contiguous newlines may span in one or more of horizontal or vertical direction within the PDF document. A newline may be identified based on occurrence of predefined width and length of contiguous pixels of the same color, for example, white. The plurality of contiguous newlines would thus create a contiguous block of a certain color (for example, white) in place of an image in the PDF document.

Once each of the one or more images have been replaced with contiguous newlines, image extraction device 104, at step 304, stores a location of each of the one or more images within the PDF document based on occurrence of the plurality of contiguous newlines. A location of an image may include a page number of a page that includes the image and coordinates (along X and Y axis within the page) of corners of the image within the page. In an embodiment, coordinates may be identified for the contiguous block that includes the plurality of contiguous newlines within a page of the PDF document. By way of an example, four coordinates, one for each corner of the contiguous block are determined and stored. A page within the PDF document may have the following dimensions: 21×29.7 cm, and we assume that top left corner of the page has the coordinates: (0,0) and bottom right corner of the page has the coordinates: (21, 29.7). Location of the contiguous block (that replaced the image) in coordinates may be stored as: top left corner: (11, 11), top right corner: (16, 11), bottom left corner: (11, 16), and bottom right corner: (16, 16). Storing location of an image in the form of coordinates enables ease of accurate location identification of the image at a later point.

In an embodiment, the location of an image may be stored by associating a location metadata with the PDF document, such that, the location metadata includes information related to the location of the image. Associating the location metadata with the PDF document enables image extraction device 104 to automatically identify location of images that need to be extracted from the PDF document.

At step 306, image extraction device 104 converts each page of the PDF document to an image format in order to generate an image document corresponding to the PDF document. The conversion of the PDF document into an image document is an intermediate step and the image format may be one of JPEG, GIF, PNG, or BMP. Once the image document has been generated, image extraction device 104, at step 308, extracts each of the one or more images from the image document based on the location stored for each of the one or more images within the PDF document. This is further explained in detail in conjunction with FIG. 4. The one or more images thus extracted are stored in a predefined format. Examples of the predefined format may include, but are not limited to JPEG, GIF, PNG, or BMP.

Figure 4:
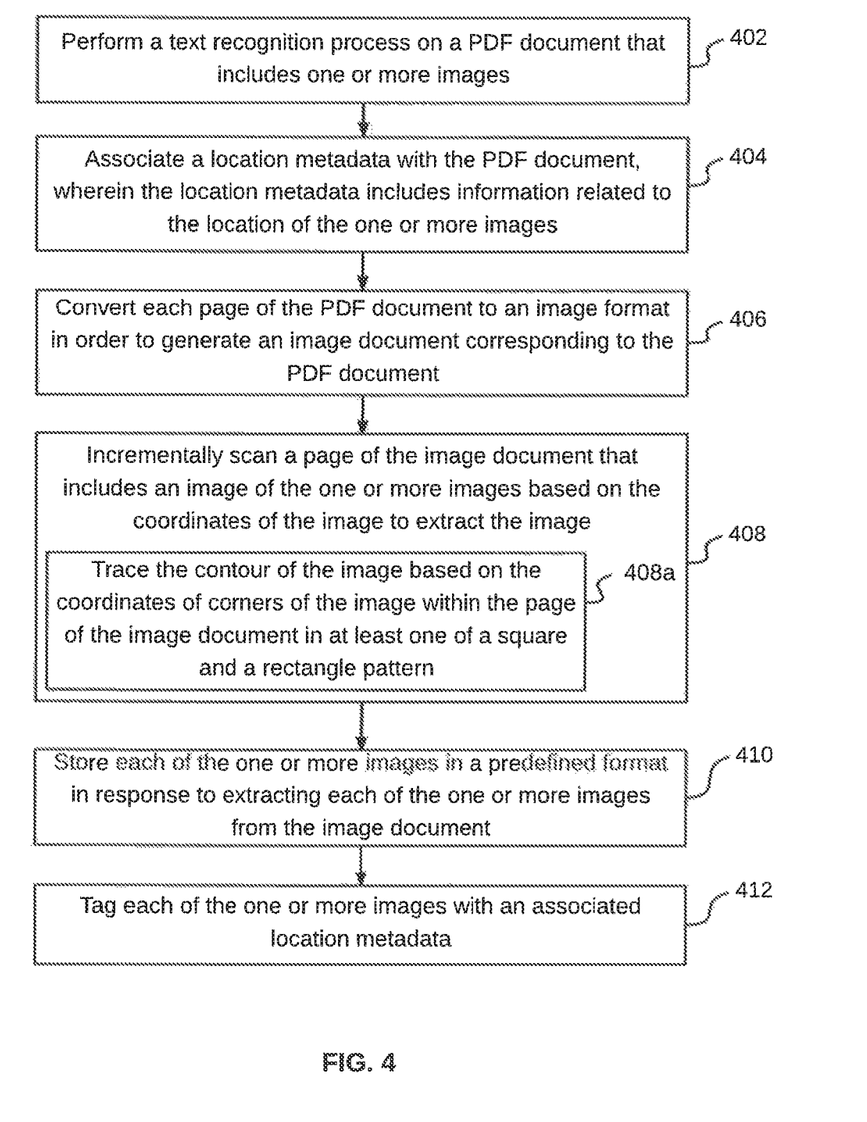
FIG. 4 illustrates a flowchart of a method of extracting images from PDF documents, in accordance with another embodiment.

Referring now to FIG. 4, a flowchart of a method for extracting images from PDF documents is illustrated, in accordance with another embodiment. At step 402, a text recognition process is performed on a PDF document that includes one or more images. At step 404, a location metadata that includes information related to the location of the one or more image is associated with the PDF document.

By associating the location metadata with the PDF document, location of the one or more images within the PDF document are stored. The location metadata for an image may include a page number of a page that includes the image and coordinates (along X and Y axis within the page) of corners of the image within the page. At step 406, each page of the PDF document is converted into an image format in order to generate an image document corresponding to the PDF document. This has already been explained in detail in conjunction with FIG. 3.

Thereafter, at step 408, based on the coordinates of an image, a page of the image document that includes the image is incrementally scanned in order to extract the image from the image document. This is repeated for each of the one or more images in the within the PDF document. Incremental scanning may include, tracing, at step 408*a*, the contour of the image based on the coordinates of corners of the image in either a square or a rectangle pattern. It will be apparent to a person skilled in the art that patterns other than a square or a rectangle may also be used for incremental scanning. In continuation of the example above, using the coordinates of the four corners of the image, i.e., (11, 11), (16, 11), (11, 16), and (16, 16), the incremental scanning in a square pattern may start at coordinates (11,11) and may terminate at the coordinates (16, 16), thereby extracting the image from the PDF document.

Once the one or more images have been extracted using incremental scanning, each of the one or more images are stored in a predefined format at step 410. In addition to storing each of the one or more images, each extracted image is tagged with an associated location metadata indicating location of the extracted image within the PDF document, at step 412. In other words, location of an extracted image within the PDF document is stored along with the image. Thus, location of an extracted image within the PDF document can be determined independent of the PDF document.

Figure 5:
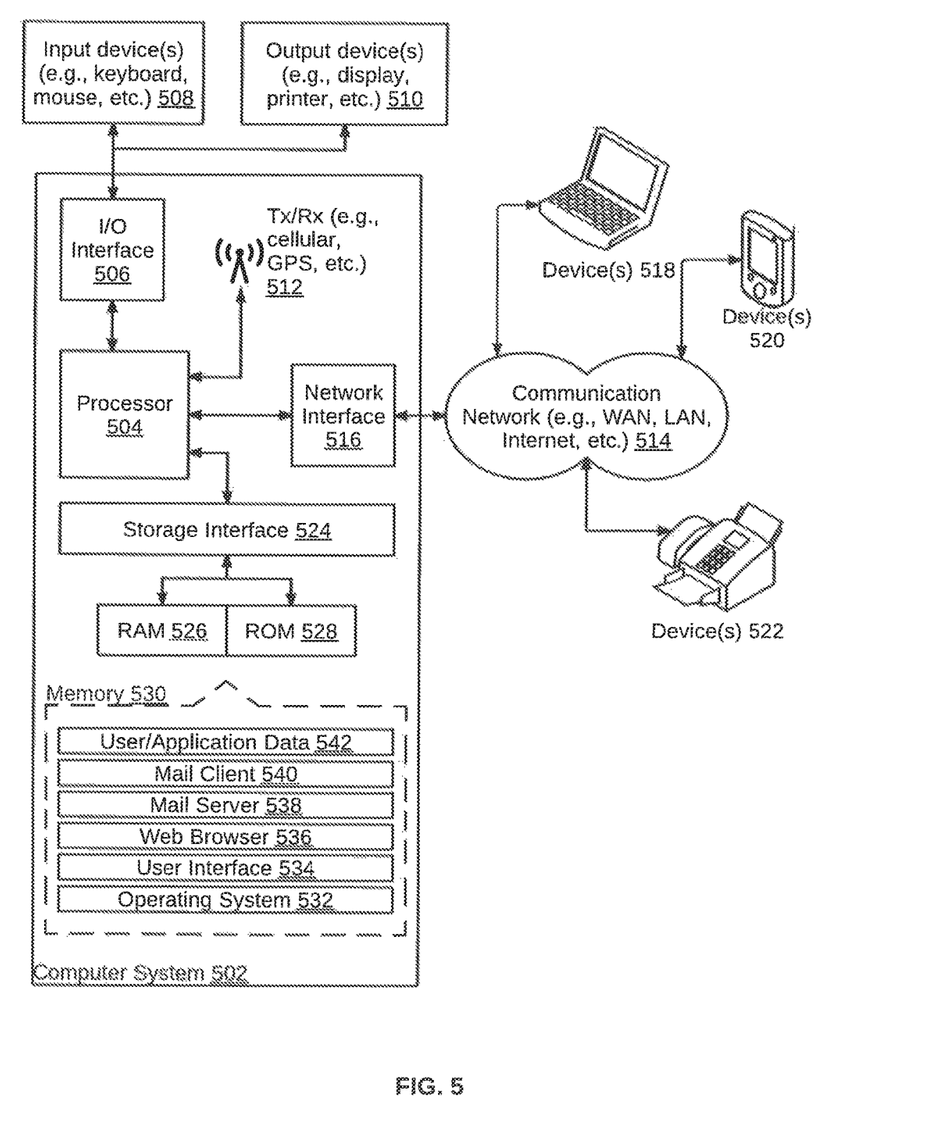
FIG. 5 illustrates a block diagram of an exemplary computer system for implementing various embodiments.

FIG. 5 is a block diagram of an exemplary computer system for implementing various embodiments. Computer system 502 may include a central processing unit ("CPU" or "processor") 504. Processor 504 may include at least one data processor for executing program components for executing user-generated requests or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of the devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (e.g., any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for extracting images from PDF documents. One or more of the images are Vector Graphic images. The proposed solution enables automatic extraction of the images without separating the images into segments, so that the image is accurately extracted in one go. Additionally, position and precise location of that image within a pdf document is also stored and tagged with the PDF document. As a result, this location information can be used later to easily extract the image and collect other information related to the image without losing any vital information.

The specification has described method and device for extracting images from PDF documents. The illustrated steps are set out to explain the exemplary embodiments shown, and it should be anticipated that ongoing technological development will change the manner in which particular functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method for extracting images from Portable Document Format (PDF) documents, the method comprising:
    performing, by an image extraction device, a text recognition process on a PDF document comprising one or more images, wherein the text recognition process replaces the one or more images with a plurality of contiguous newlines;
    storing, by the image extraction device, a location of each of the one or more images within the PDF document based on occurrence of the plurality of contiguous newlines within the PDF document;
    converting, by the image extraction device, each page of the PDF document to an image format in order to generate an image document corresponding to the PDF document;
    incrementally scanning, by the image extraction device, a page of the image document comprising the image wherein the scanning comprises tracing contour of the image based on the coordinates of corners of the image within the page in at least one of a square and a rectangle pattern; and
    extracting, by the image extraction device, each of the one or more images from the image document based on the location stored for each of the one or more images within the PDF document.

2. The method of claim 1, wherein at least one of the one or more images is a vector graphic image.

3. The method of claim 1, wherein storing a location of an image from the one or more images within the PDF document comprises associating a location metadata with the PDF document, wherein the location metadata comprises information related to the location of the image.

4. The method of claim 1, wherein a location of an image from the one or more images comprises a page number of a page including the image and coordinates of corners of the image within the page.

5. The method of claim 1 further comprising storing each of the one or more images in a predefined format in response to extracting each of the one or more images from the image document.

6. The method of claim 5, wherein an extracted image is tagged with an associated location metadata indicating location of the extracted image within the PDF document.

7. The method of claim 1, wherein the text recognition process is performed using an Open source Computer Vision (OpenCV) tool.

8. An image extraction device for extracting images from Portable Document Format (PDF) documents, the image extraction device comprising:
    at least one processor; a memory communicatively coupled to the processor, wherein the memory stores processor instructions, which, on execution, causes the processor to:
    perform a text recognition process on a PDF document comprising one or more images, wherein the text recognition process replaces the one or more images with a plurality of contiguous newlines;

store a location of each of the one or more images within the PDF document based on occurrence of the plurality of contiguous newlines within the PDF document;

convert each page of the PDF document to an image format in order to generate an image document corresponding to the PDF document;

incrementally scan a page of the image document comprising the image wherein the scanning comprises tracing the contour of the image based on the coordinates of corners of the image within the page in at least one of a square and a rectangle pattern; and extract each of the one or more images from the image document based on the location stored for each of the one or more images within the PDF document.

9. The image extraction device of claim 8, wherein at least one of the one or more images is a vector graphic image.

10. The image extraction device of claim 8, wherein to store a location of an image from the one or more images within the PDF document, the processor instructions further cause the processor to associate a location metadata with the PDF document, wherein the location metadata comprises information related to the location of the image.

11. The image extraction device of claim 8, wherein a location of an image from the one or more images comprises a page number of a page including the image and coordinates of corners of the image within the page.

12. The image extraction device of claim 8, wherein the processor instructions further cause the processor to store each of the one or more images in a predefined format in response to extracting each of the one or more images from the image document.

13. The image extraction device of claim 12, wherein an extracted image is tagged with an associated location metadata indicating location of the extracted image within the PDF document.

14. The image extraction device of claim 8, wherein the text recognition process is performed using an Open source Computer Vision (OpenCV) tool.

15. A non-transitory computer-readable storage medium having stored thereon, a set of computer-executable instructions causing a computer comprising one or more processors to perform steps comprising:

performing a text recognition process on a PDF document comprising one or more images, wherein the text recognition process replaces the one or more images with a plurality of contiguous newlines;

storing a location of each of the one or more images within the PDF document based on occurrence of the plurality of contiguous newlines within the PDF document;

converting each page of the PDF document to an image format in order to generate an image document corresponding to the PDF document;

incrementally scanning, by the image extraction device, a page of the image document comprising the image wherein the scanning comprises tracing contour of the image based on the coordinates of corners of the image within the page in at least one of a square and a rectangle pattern; and extracting each of the one or more images from the image document based on the location stored for each of the one or more images within the PDF document.

* * * * *